Dec. 4, 1962
A. KOHLHAUF
3,066,648
HOLDER FOR BIRD SEED
Filed April 24, 1961
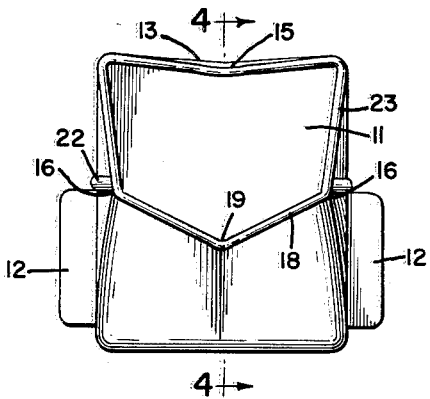
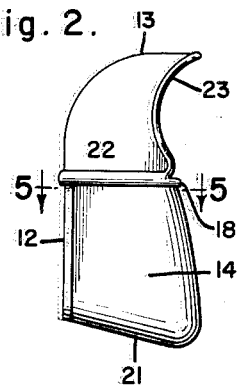
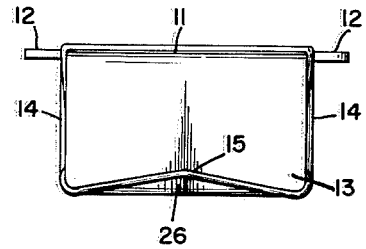
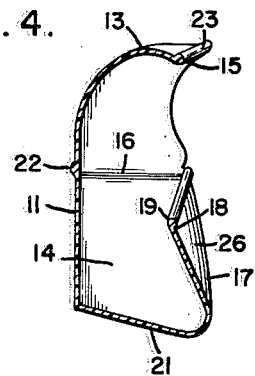
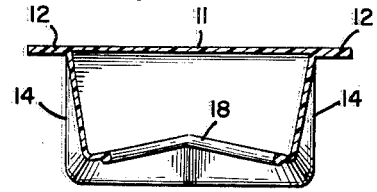
INVENTOR.
Ann Kohlhauf
BY
Julian Caplan
Attorney United States Patent Office 3,066,648
Patented Dec. 4, 1962

3,066,648
HOLDER FOR BIRD SEED
Ann Kohlhauf, 103 Lower Terrace,
San Francisco 14, Calif.
Filed Apr. 24, 1961, Ser. No. 104,953
4 Claims. (Cl. 119—51)

This invention relates to a new and improved holder for bird seed and, more particularly, relates to a type of holder wherein the container is curved inwardly around the opening so that when the bird feeds seed rolls toward the V-shaped front.

One of the problems encountered in the use of bird seed holders is the fact that the bird perches in such position that its head is inside the holder while eating, with the result that the hulls or husks of the seed are dropped inside the holder and accumulate as a layer on the top of the remaining seed. When the seed has been covered, the bird stops feeding because he cannot locate the seeds obscured by the husks. Accordingly, the principal object of the present invention is to provide a holder so shaped that the normal tendency of the bird is not to put its head inside the holder but to feed at the point of the V-shaped front and hence the husks fall to the bottom of the cage and do not obscure the seed in the holder.

A still further object of the invention is to provide an improved holder of the character heretofore described, wherein the means of attachment to the cage is conventional and hence no alteration of the cage structure is required.

Other objects of the present invention will become apparent upon reading the following specification and referring to the accompanying drawings in which similar characters of reference represent corresponding parts in each of the several views.

In the drawings:

FIG. 1 is a front elevation of the device.

FIG. 2 is a side elevation thereof.

FIG. 3 is a top plan.

FIG. 4 is a vertical mid-sectional view taken substantially along the line 4—4 of FIG. 1.

FIG. 5 is a horizontal sectional view taken substantially along the line 5—5 of FIG. 2.

Conventional holders for bird seed are attached by means forming no part of the present invention to the bars of the cage and hang on the cage sides. The bird perches on a perch provided in proximity to holder and feeds on the seed in the holder. The present invention is in many respects similar to conventional holders but is of an improved construction.

Thus, the present invention comprises a substantially vertical and flat back 11 which conforms to the contour of the cage at the position where the holder is installed. Projecting laterally from each side of back 11 are tabs 12 which fit in the cage bars or other means for retaining the holder in the cage. The back curves at the top upwardly and inwardly in a hood 13. Hood 13 is depressed at the center of the forward edge as indicated by reference numeral 15. In accordance with the present invention, the sides 14 which extend inwardly of either side edge of the back 11 are bowed slightly inwardly at about the center of the side, as indicated by reference numeral 16, and then are bowed outwardly to conform to the top edge of the back. The front 17 of the holder curves rearwardly at the center to a position indicated by reference numeral 19, as is best shown in FIG. 4. A reinforcing rim 22 extends horizontally around the holder at the sides and back and similarly a reinforcing rim 23 extends along the top edge of the front and the sides and top, all for the purpose of reinforcing the edges and preventing occurrence of a sharp edge which might injure the bird.

It will be seen that the shape of the holder permits the seed to be heaped inside the holder and to roll toward the V-shaped edge 19 when the bird is feeding. This condition exists by reason of the fact that the front 17 of the holder is slanted rearwardly and likewise the sides 16 are slanted inwardly. The formation of the holder is such that the normal reaction of the bird is to feed at the point 19 of the V-shaped front and when the husks of the seed fall from the bird's mouth they drop on the outside 26 of the front and are directed to the floor of the cage rather than falling inside the holder.

The result of the formation of the holder heretofore described is to improve the efficiency of the device by making it possible for the bird to eat a larger percentage of the seed in the holder than is normally the case. Particularly when birds are left unattended for considerable periods of time they tend to feed poorly because the husks of the seeds drop on top of the seeds in the holder and obscure the underlying seeds, with the result that the bird ceases to feed until the husks are removed. This problem is eliminated by means of the present invention and promotes the greater health of the bird.

Although the foregoing invention has been described in some detail, by way of illustration and example for purposes of clarity of understanding, it is understood that certain changes and modifications may be practiced within the spirit of the invention and scope of the appended claims.

What is claimed is:

1. A bird seed holder comprising a hollow body, and means for connection of said body to a bird cage, said body having a back, sides, bottom and an apertured front, said front slanting inwardly-upwardly from said bottom, said front having a shallow V-shaped upper edge converging downward to a point, said front above said point slanting inwardly downwardly to join the inwardly upwardly slanting portion of said front below said point, whereby the bird is induced to feed at the point of the V-shaped front upper edge, causing the husks of the seed to drop outside said holder to the floor of the cage.

2. A holder according to claim 1, in which said sides are slanted inwardly at a level adjacent the bottom of said V.

3. A bird seed holder comprising a substantially vertical back, tabs extending laterally from said back for attachment of said holder to a cage, a hood extending upward and forward from said back, a bottom at the bottom of said back, sides on either side of said back, and a front of lesser height than said back, there being an opening for the head of a bird between the top of said front and said hood and between said sides, the upper edge of said front being formed in a shallow V, said front slanting upwardly-inwardly from its bottom edge to said V, whereby seed may be heaped in the holder to roll toward said V as the the bird feeds.

4. A holder according to claim 3, in which said sides are slanted inwardly at a level adjacent the bottom of said V.

References Cited in the file of this patent

UNITED STATES PATENTS 2,190,119  Hoefler _____ Feb. 13, 1940
2,334,590  Spiro et al. _____ Nov. 16, 1943

FOREIGN PATENTS 444,041  Great Britain _____ Mar. 12, 1936